(12) United States Patent
Recker

(10) Patent No.: US 11,067,117 B2
(45) Date of Patent: Jul. 20, 2021

(54) BALL-SOCKET GROMMET

(71) Applicant: NIFCO AMERICA CORP., Canal Winchester, OH (US)

(72) Inventor: Derek Recker, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 483 days.

(21) Appl. No.: 15/997,104

(22) Filed: Jun. 4, 2018

(65) Prior Publication Data

US 2019/0368535 A1 Dec. 5, 2019

(51) Int. Cl.
*F16C 11/06* (2006.01)

(52) U.S. Cl.
CPC ...... *F16C 11/0647* (2013.01); *F16C 11/0657* (2013.01); *F16C 11/0685* (2013.01); *F16C 2202/06* (2013.01); *F16C 2208/04* (2013.01); *F16C 2208/60* (2013.01)

(58) Field of Classification Search
CPC ............ F16C 11/06–086; F16C 11/106; F16C 11/0619; F16C 11/0623; F16C 11/0642; F16C 11/0647; F16C 11/0695; Y10T 403/32196; Y10T 403/32204; Y10T 403/32311; Y10T 403/32631–32811; Y10T 403/32647; Y10T 403/32663; Y10T 403/11

See application file for complete search history.

(56) References Cited

U.S. PATENT DOCUMENTS

| 5,653,548 | A  | * | 8/1997 | Amdahl | ............. F16C 11/0657 403/122 |
| 6,837,716 | B1 | * | 1/2005 | Brazas | ..................... B60Q 1/06 403/122 |
| 9,316,250 | B2 | * | 4/2016 | Elterman | ............ F16C 11/0604 |
| 9,920,788 | B2 | * | 3/2018 | Trotter | ................ F16C 11/0695 |

* cited by examiner

*Primary Examiner* — Daniel J Wiley
(74) *Attorney, Agent, or Firm* — Manabu Kanesaka

(57) ABSTRACT

A socket grommet formed from fiber-reinforced material, for attaching a stud pin with a head portion to a bracket, includes a body member; a first supporting member for supporting one side of the head portion; and second supporting members for supporting another side of the head portion. The first supporting member includes a supporting portion on one side of the body member and connecting portions connecting the supporting portion to the body member. Each connecting portion includes a breaking portion having a thickness less than a remaining portion thereof to be breakable upon a predetermined force. Each second supporting member includes a first connecting piece extending from the body member to another side of the body member, and a second connecting piece extending from the first connecting piece to the one side of the body member and having a supporting piece for contacting the another side of the head portion.

4 Claims, 5 Drawing Sheets

BALL-SOCKET GROMMET

FIELD OF THE INVENTION

The present invention relates to a ball-socket grommet for an automobile. More specifically, the present invention relates to a ball-socket grommet for a bracket of an automobile, to support a stud pin while being formed from fiber-reinforced material to increase the strength and rigidity.

BACKGROUND OF THE INVENTION

An automobile manufactured nowadays includes many different sensors such as sensors to detect objects around the automobile and alert the driver accordingly. Such sensors are mounted on a body of the automobile through brackets. These brackets are formed with a plurality of holes to fit ball-socket grommets, which receive stud pins. The conventional ball-socket grommets are formed from non-fiber-reinforced material such as Nylon, which has sufficient flexibility to receive the stud pin. The stud pin has a ball portion on one end to connect to the ball-socket grommet and the other end to connect to the sensor or a sensor housing.

PROBLEMS TO BE SOLVED BY THE INVENTION

These grommets are attached to the brackets to continuously support the sensor. Over time, the strength of grommet to retain the stud pin may weaken or the fitment between the grommet and the bracket may loosen due to material fatigue. Therefore, there is a concern for conventional grommets formed from non-fiber-reinforced Nylon failing due to insufficient strength and rigidity. Forming the grommets in fiber-reinforced material increases the strength and rigidity of the grommet, however, the design of the conventional grommets causes the portions receiving the stud pin to have insufficient flexibility such that the portions cannot bend to receive the stud pin.

Further, some of these brackets are mounted on a front side of the automobile behind the grill. Therefore, there is another concern that when a front end collision occurs between the automobile and the pedestrian, the sensor along with the bracket may cause further injuries to the pedestrian.

Thus, the object of the present invention is to provide a ball-socket grommet having sufficient strength and rigidity to maintain the connection between the bracket and the sensor and sufficient retaining strength to retain the stud pin while absorbing the impact force against the pedestrian.

Other objects and advantages of the invention are apparent from the following description of the invention.

MEANS FOR SOLVING THE PROBLEMS

In order to obtain the aforementioned object, in the present invention, a socket grommet adapted to attach a stud pin with a head portion to a bracket, includes a body member adapted to contact the bracket, and having a through-hole at a center thereof; a first supporting member adapted to support one side of the head portion; and a plurality of second supporting members adapted to support another side of the head portion. The first supporting member includes a supporting portion arranged on one side of the body member, and having an inner surface facing the through-hole of the body member and adapted to contact the one side of the head portion, and a plurality of connecting portions extending from a periphery of the supporting portion to an inner periphery of the body member and connecting the first supporting member to the body member, the plurality of connecting portions being spaced apart from each other.

Each second supporting member includes a first connecting piece extending from the inner periphery of the body member between two adjacent connecting portions to another side of the body member opposite to the one side of the body member in an axial direction of the body member, and a second connecting piece extending from corresponding first connecting piece to the one side of the body member through the through-hole and having a supporting piece at an end portion thereof. The supporting piece is arranged between the body member and the supporting portion of the first supporting member in the axial direction and adapted to contact the another side of the head portion.

According to such configuration, the grommet has sufficient flexibility to receive the ball portion of the stud pin while being formed from fiber-reinforced material, which increases the strength and rigidity.

Further, the grommet according to the present embodiment further includes a breaking portion having a thickness less than a remaining portion of the connecting portion.

According to such configuration, the grommet is capable of breaking after a predetermined force, e.g. force from collision with a pedestrian, so that the sensor breaks away from the bracket to absorb the impact force and reduce the impact against the pedestrian.

Further, according to the present embodiment, each of the plurality of second supporting members includes a reinforcing rib protruding outwardly from an outer face of the second connecting piece, and the body member further includes a plurality of grooves positioned on the body member corresponding to the reinforcing ribs, respectively, so that the plurality of grooves receives the plurality of reinforcing ribs when the plurality of second connecting pieces deforms outwardly due to an insertion of the head portion through the through-hole from the another side of the body member.

According to such configuration, structural strength is provided at appropriate areas of the grommet to retain the stud pin while capable of breaking from the impact force.

Other features of the present embodiment will become apparent from the following detailed description and the scope of patent claims taken in conjunction with the accompanying drawings.

DETAILED DESCRIPTION OF THE EMBODIMENTS

Hereinafter, the present embodiment is explained based on the drawings.

FIGS. 1-7 disclose a ball-socket grommet 100 of the present embodiment. The ball-socket grommet 100 is structured to attach to a hole H of a bracket BR and to receive a head portion ("ball portion") B of a stud pin P. The ball-socket grommet 100 is formed from fiber-reinforced material, and includes a body member 1 adapted to contact the bracket BR, a first supporting member 3 adapted to support one side of the ball portion B of the stud pin P, and a plurality of second supporting members 5 adapted to support another side of the ball portion B of the stud pin P.

Figure 1:
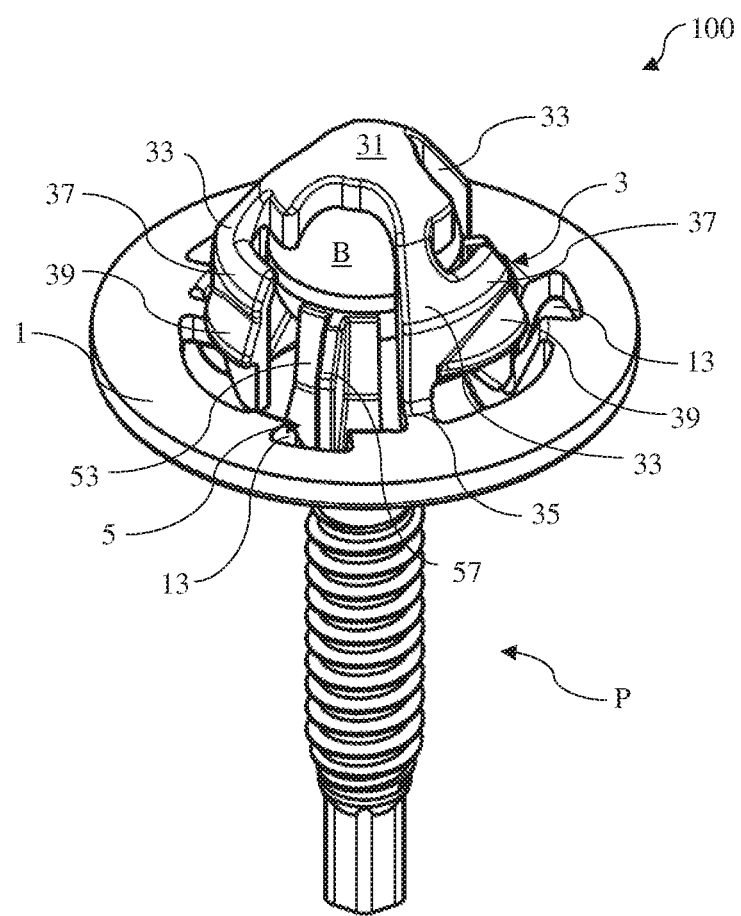
FIG. 1 is a perspective view of a ball-socket grommet of the present embodiment with a stud pin.
Figure 2:
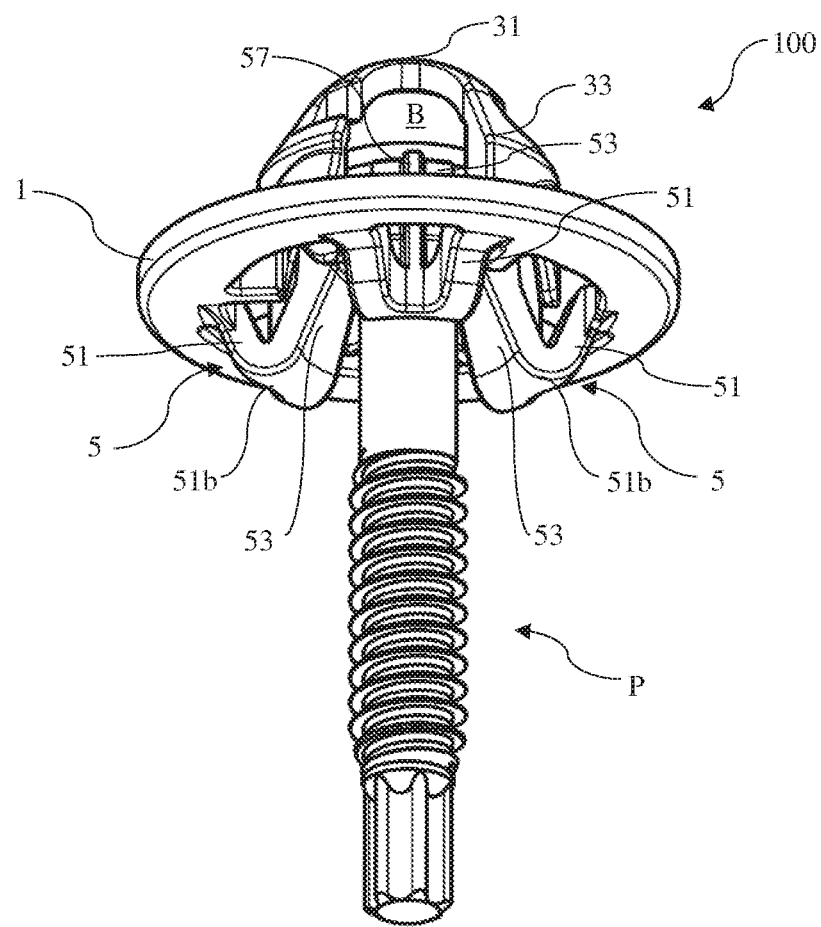
FIG. 2 is another perspective view of the ball-socket grommet of the present embodiment with the stud pin.
Figure 3:
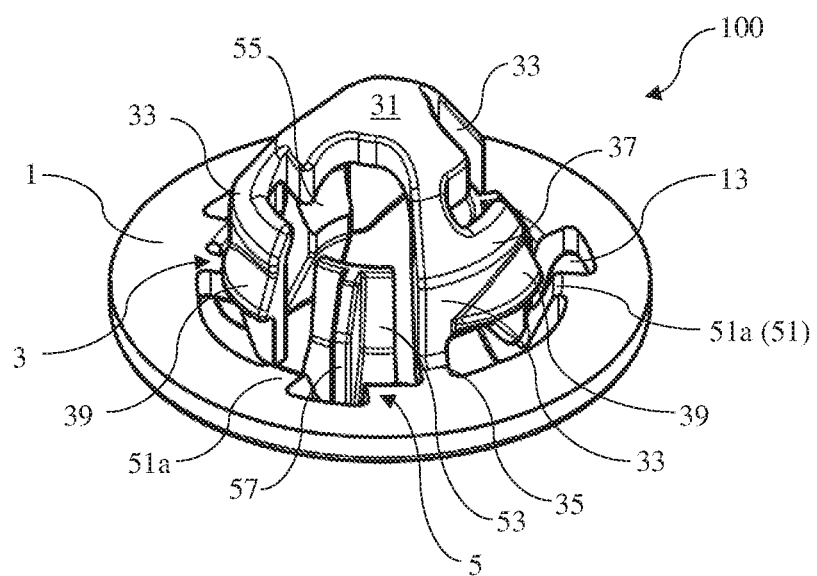
FIG. 3 is a perspective view of the ball-socket grommet of the present embodiment.
Figure 4:
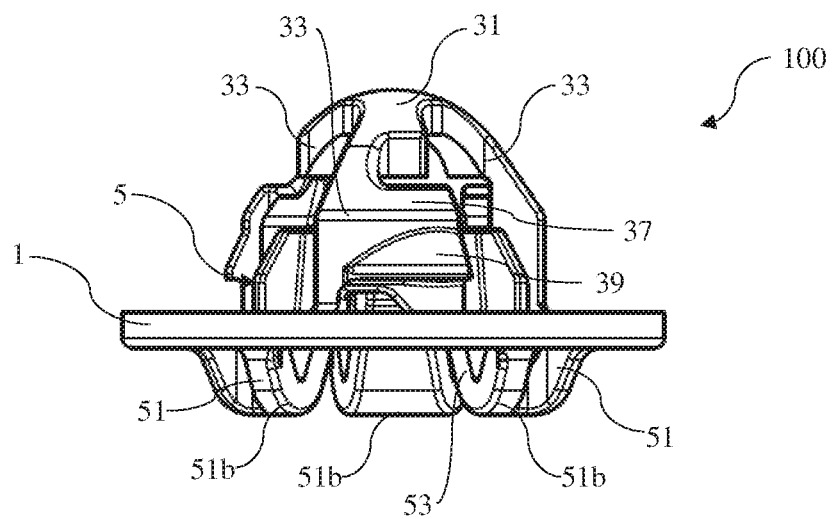
FIG. 4 is a side view thereof.
Figure 5:
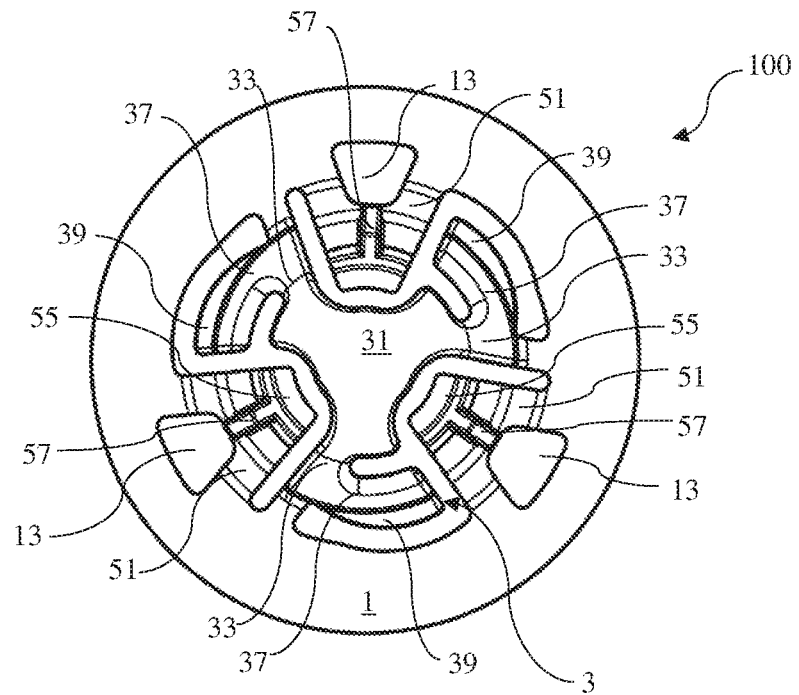
FIG. 5 is a plan view thereof.
Figure 6:
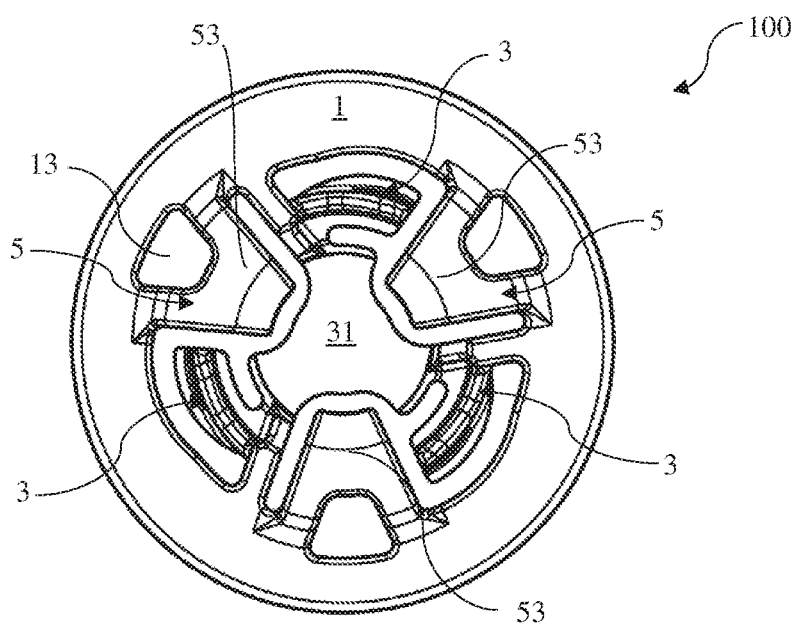
FIG. 6 is a bottom view thereof.
Figure 7:
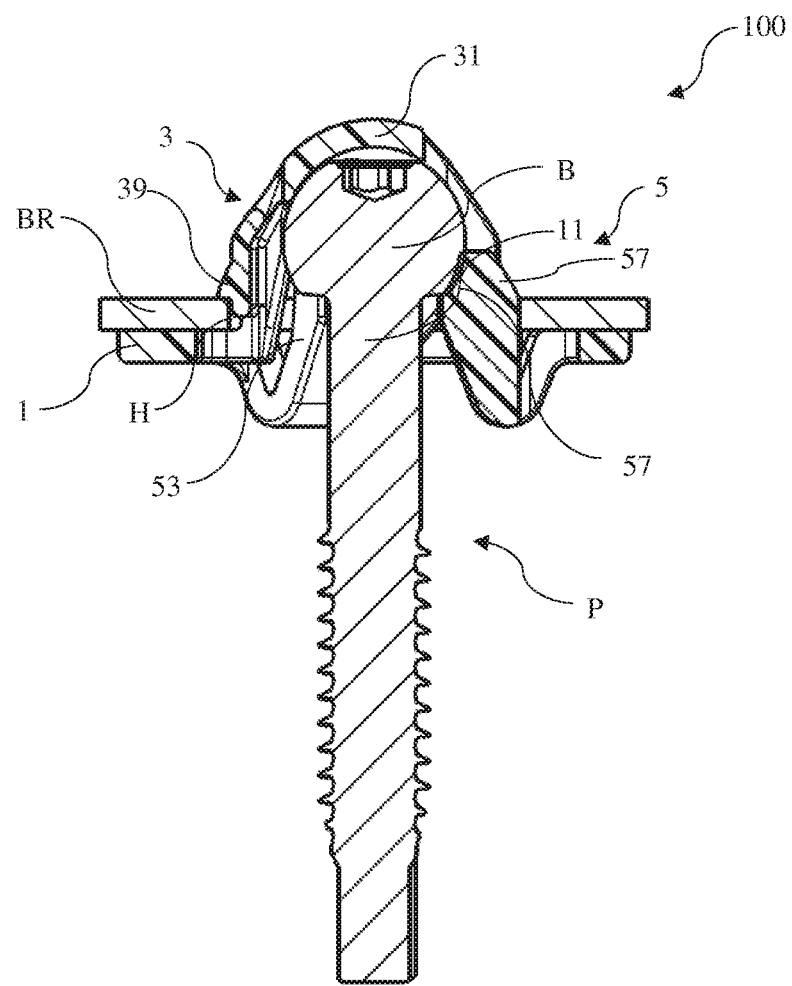
FIG. 7 is a cross-sectional view of the ball-socket grommet of the present embodiment in a state in which the ball-socket grommet attaches the stud pin to a bracket.

As shown in FIG. 7, the body member 1 is formed to contact the bracket BR at one surface, and has a circular through-hole 11 at a center thereof to allow the ball portion B of the stud pin P to pass therethrough. In the present embodiment, the body member 1 has a circular shape. An inner periphery of the body member 1 is formed with a plurality of grooves 13 to receive a plurality of reinforcing ribs 57 of the second supporting member 5, respectively, when the plurality of second supporting member 5 deforms outwardly due to an insertion of the ball portion B through the through-hole 11 from the another side of the body member 1, see FIG. 7.

One side of the body member 1 is arranged with the first supporting member 3. The first supporting member 3 is adapted to support the one side of the ball portion B of the stud pin P. The first supporting member 3 includes a supporting portion 31, a plurality of connecting portions 33, a plurality of flexible portions 37, and a plurality of flange pieces 39.

The supporting portion 31 is formed to pass through the hole H of the bracket BR, and has an arc shape wherein an inner surface is a concave surface facing toward the through-hole 11 of body member 1 and adapted to contact the one side of the ball portion B for supporting the stud pin P.

The plurality of connecting portions 33 connects a periphery of the supporting portion 31 to the inner circumference of the body member 1. In the present embodiment, three connecting portions 33 are provided and spaced equally from each other in a circumferential direction of the body member 1.

Each connecting portion 33 includes a breaking portion 35, which is a portion of the connecting portion 33 having a thickness less than the other portions of the connecting portion 33 so that upon receiving an impact force due to a collision with a pedestrian, the breaking portion 35 breaks to absorb the impact force and the sensor moves backward to reduce an injury to the pedestrian. In the present embodiment, the breaking portion 35 is formed where the connecting portion 33 connects to the body member 1.

The plurality of flexible portions 37 extends from intermediate portions of the plurality of connecting portions in the circumferential direction, respectively. More specifically, each flexible portion 37 has a flexibility to bend radially inwardly and extends from the corresponding connecting portion 33 toward the adjacent second supporting member 5.

The plurality of flange pieces 39 protrudes radially outwardly from the plurality of flexible portions 37, respectively. Each flange piece 39 extends circumferentially along an outer surface of the corresponding flexible portion 37. Upon the flange piece 39 abutting against an edge of the hole H of the bracket BR, the flexible portion 37 bends radially inwardly to pass through the hole H of the bracket BR, and after passing through the hole H of the bracket BR, the flexible portion 37 returns to its original position and the flange piece 39 sandwiches the bracket BR together with the body member 1 to attach the grommet 100 to the bracket BR, see FIG. 7.

The plurality of second supporting members 5 is provided to support the another side of the ball portion B for supporting the stud pin P. Each second supporting member 5 includes a first connecting piece 51, a second connecting piece 53, and a reinforcing rib.

The first connecting piece 51 extends from the inner circumference of the body member 1 to the another side of the body member 1. In the present embodiment, three first connecting pieces 51 are provided wherein each first connecting piece 51 is provided between adjacent connecting portions 33 and extending toward a center of the grommet 100 so that the first connecting piece 51 is inclined in respect to an axis of the grommet 100. Each first connecting piece 51 has a V-shape and includes two first ends 51a connected to the body member 1 with the groove 13 formed therebetween and one second end 51b disposed at the another side of the body member 1 and connected to the second connecting piece 53.

The second connecting piece 53 extends from the second end 51b of the first connecting piece 51 to the one side of the body member 1 through the through-hole 11. The second connecting piece 53 extends toward the center of the grommet 100 so that the second connecting piece 53 is inclined in respect to the axis of the grommet 100. The second connecting piece 53 is formed to contact and guide the ball portion B toward the supporting portion 31.

Each second connecting piece 53 has a supporting piece 55 at an end portion thereof between the body member 1 and the supporting portion 31. The supporting piece 55 has an arc-shape to contact the another side of the ball portion B for supporting the stud pin P. In other words, the plurality of supporting pieces 55 and the supporting portion 31 define a space to receive the ball portion B of the stud pin P.

Further, the reinforcing rib 57 is formed on each second connecting piece 53. The reinforcing rib 57 extends along an outer face of the second connecting piece 53 facing toward the body member 1. The reinforcing rib 57 increases the retaining force of the second connecting piece 53 in an axial direction of the grommet 100 so that the ball portion B of the stud pin P is retained within the grommet 100.

Next, the operation of the grommet 100 is described in detail below.

First, the stud pin P is attached to the grommet 100. The ball portion B of the stud pin P is inserted into the grommet 100 from the another side of the body member 1 through the through-hole 11. The ball portion B abuts against the second connecting pieces 53 causing the second connecting pieces 53 to bend radially outwardly. The grooves 13 receive the reinforcing ribs 57, and the ball portion B advances into the space defined by the plurality of supporting pieces 55 and the supporting portion 31. The second connecting pieces 53 bend back to its original position and the ball portion B is retained in the space; thereby, the stud pin P is retained in the grommet 100.

Next, the grommet 100 with the stud pin P is attached to the bracket BR through the hole H. The supporting portion 31 is inserted into the hole H. The flange pieces 39 of the plurality of first supporting member 3 abut against the edge of the hole H of the bracket BR, and the flexible portions 37 bend radially inwardly to pass through the hole H. After the flange pieces 39 pass through the hole H, the flexible portions 37 return to its original position, and the flange pieces 39 and the body member 1 sandwich the bracket BR, thereby, the grommet 100 is attached to the bracket BR, see FIG. 7.

In the present embodiment, the first connecting piece 51 is formed to extend to the another side of the body member 1 and the second connecting piece 53 is formed to extend to the one side of the body member 1, so that the total length of the second supporting member 5 is increased. By increasing the total length of the second supporting member 5, the flexibility of the second supporting member 5 is also increased. Thereby, the grommet 100 can be formed from fiber-reinforced material, which is less flexible than conventional non-fiber-reinforced material. Therefore, the grommet 100 formed from fiber-reinforced material has an increased strength and rigidity compared to the conventional grommet formed from non-fiber-reinforced material; thereby, the object of the present invention is achieved.

Further, the fiber-reinforced material for the grommet of the present embodiment may be nylon reinforced by fiber such as glass fiber, carbon fiber, basalt fiber, etc. If glass fiber is selected, in addition to the increase of strength and rigidity of the grommet, the heat resistance of the grommet will also increase. Some of the brackets are mounted near an engine or other high heat sources, or in a high temperature environment; therefore, grommets formed from glass fiber reinforced nylon may be used in places where heat is a concern.

Further, in the present embodiment, the reinforcing ribs 57 and the breaking portions 35 are provided so that the impact force to the pedestrian is reduced without sacrificing the retaining force of the grommet 100 to retain the ball portion B of the stud pin P. More specifically, while the grommet 100 retains the stud pin P and is attached to the bracket BR through the hole H, if the stud pin P receives a force in a direction to release the stud pin P from the grommet 100 (direction opposite to the inserting direction of the stud pin P), the second supporting member 5 is prevented from bending radially outwardly due to the abutment of the reinforcing ribs 57 against the edge of the hole H; thereby, the reinforcing ribs 57 prevent the stud pin P from being released from the grommet 100. The breaking portions 35 are formed on the first supporting member 3, which are formed separately from the second supporting member 5 so that the breaking portions 35 remain breakable upon a predetermined impact force without interfering with the retaining force of the second supporting member 5. Thus, the other objects of the present invention are also achieved.

The above description simply illustrates the principle of the invention. Furthermore, a great number of modifications and alterations are possible for those skilled in the art, and the invention is not limited to the heretofore illustrated and described exact configurations and applications. All corresponding modification examples and equivalents are deemed to be within the scope of the invention defined by the attached claims and their equivalents.

What is claimed is:

1. A grommet adapted to attach a stud pin with a head portion to a bracket, comprising:
    a body member adapted to contact the bracket, and having a through-hole at a center thereof;
    a first supporting member adapted to support one side of the head portion, including
        a supporting portion arranged on one side of the body member, and having an inner surface facing the through-hole of the body member and adapted to contact the one side of the head portion, and
        a plurality of connecting portions extending from a periphery of the supporting portion to an inner periphery of the body member and connecting the first supporting member to the body member, the plurality of connecting portions being spaced apart from each other; and
    a plurality of second supporting members adapted to support another side of the head portion, each second supporting member including
        a first connecting piece extending from the inner periphery of the body member between two adjacent connecting portions to another side of the body member opposite to the one side of the body member in an axial direction of the body member, and
        a second connecting piece extending from the first connecting piece to the one side of the body member through the through-hole and having a supporting piece at an end portion thereof, the supporting piece being arranged between the body member and the supporting portion of the first supporting member in the axial direction and adapted to contact the another side of the head portion,
    wherein each of the plurality of second supporting members further includes a reinforcing rib protruding outwardly from an outer face of the second connecting piece, and
    the body member further includes a plurality of grooves at portions corresponding to the reinforcing ribs, respectively, so that the plurality of grooves receives the plurality of reinforcing ribs when the plurality of second connecting pieces deforms outwardly due to an insertion of the head portion through the through-hole from the another side of the body member.

2. The grommet according to claim 1, wherein the first supporting member further includes
    a flexible portion extending from each connecting portion toward an adjacent second supporting member and having a flexibility to bend inwardly, and
    a flange piece protruding outwardly from an outer surface of each flexible portion and adapted to sandwich the bracket with the body member, and
    the flexible portion is configured to bend inwardly upon the flange piece abutting an edge of the hole of the bracket.

3. The grommet according to claim 2, wherein the body member, the first supporting member, and the plurality of second supporting members are formed as one member from fiber-reinforced material.

4. The grommet according to claim 1, wherein each connecting portion of the first supporting member includes a breaking portion having a thickness less than a remaining portion of the connecting portion.

* * * * *